United States Patent [19]

Wiseman

[11] Patent Number: 5,741,448
[45] Date of Patent: Apr. 21, 1998

[54] SHRINK-CONTROLLED RESIN COMPOSITION

[75] Inventor: Dean H. Wiseman, Raleigh, N.C.

[73] Assignee: Reichhold Chemicals, Inc., Research Triangle Park, N.C.

[21] Appl. No.: 615,456

[22] Filed: Mar. 14, 1996

[51] Int. Cl.$^6$ ............................................ B29C 35/18
[52] U.S. Cl. .................. 264/28; 264/257; 264/331.18; 264/331.21; 264/347; 523/510; 523/513; 523/526; 525/111; 525/170
[58] Field of Search .................. 264/230, 331.18, 264/331.21, 347, 257, 28; 525/111, 170, 177; 523/510, 513, 526

[56] References Cited

U.S. PATENT DOCUMENTS

| | | | |
|---|---|---|---|
| 3,256,362 | 6/1966 | Craubner et al. | 260/862 |
| 3,281,498 | 10/1966 | Watkins, Jr. et al. | 260/873 |
| 3,431,320 | 3/1969 | Baum et al. | 260/865 |
| 3,504,080 | 3/1970 | Siggel et al. | 264/235 |
| 3,594,439 | 7/1971 | Baker | 260/863 |
| 3,701,748 | 10/1972 | Kroekel | 260/40 |
| 3,721,722 | 3/1973 | Baum | 260/862 |
| 3,810,863 | 5/1974 | Hatton, Jr. et al. | 260/40 R |
| 3,852,376 | 12/1974 | Bando et al. | 260/862 |
| 3,937,757 | 2/1976 | Seydl et al. | 260/873 |
| 3,969,311 | 7/1976 | Kubota | 260/40 R |
| 4,016,116 | 4/1977 | Poy | 260/2.5 P |
| 4,062,826 | 12/1977 | Hutchinson et al. | 260/40 TN |
| 4,083,890 | 4/1978 | Drake et al. | 260/836 |
| 4,172,059 | 10/1979 | Atkins et al. | 260/22 CB |
| 4,273,689 | 6/1981 | Smearing | 260/22 CB |
| 4,288,571 | 9/1981 | Comstock et al. | 525/170 |
| 4,294,751 | 10/1981 | Gardner | 206/40 R |
| 4,294,941 | 10/1981 | Owen, Jr. | 525/171 |
| 4,320,045 | 3/1982 | Owen | 523/523 |
| 4,373,067 | 2/1983 | Dieck et al. | 525/146 |
| 4,409,344 | 10/1983 | Moulson et al. | 523/512 |
| 4,444,931 | 4/1984 | Lu et al. | 524/227 |
| 4,460,729 | 7/1984 | Books | 524/394 |
| 4,506,050 | 3/1985 | Hergenrother et al. | 524/143 |
| 4,525,498 | 6/1985 | Atkins et al. | 523/511 |
| 4,547,536 | 10/1985 | Nabors | 523/514 |
| 4,673,706 | 6/1987 | Atkins | 525/31 |
| 4,698,411 | 10/1987 | Hill, Jr. et al. | 528/303 |
| 4,753,982 | 6/1988 | Hefner, Jr. | 525/31 |
| 4,826,885 | 5/1989 | Tsai | 521/176 |
| 4,829,106 | 5/1989 | Holoch et al. | 523/506 |
| 4,839,446 | 6/1989 | Culbertson et al. | 525/504 |
| 4,880,846 | 11/1989 | Tufts et al. | 521/129 |
| 4,891,406 | 1/1990 | Bittscheidt et al. | 525/64 |
| 4,935,453 | 6/1990 | Bock et al. | 521/113 |
| 4,983,660 | 1/1991 | Yoshida et al. | 524/369 |
| 5,149,589 | 9/1992 | Naritomi et al. | 428/412 |
| 5,298,560 | 3/1994 | Aida et al. | 525/192 |
| 5,306,773 | 4/1994 | Wiseman et al. | 525/111 |
| 5,349,007 | 9/1994 | Serizawa et al. | 524/513 |
| 5,380,799 | 1/1995 | Wiseman et al. | 525/111 |
| 5,401,803 | 3/1995 | Rex | 525/170 |
| 5,414,043 | 5/1995 | Hesse et al. | 525/64 |
| 5,447,676 | 9/1995 | Fukuda et al. | 264/331.18 |

FOREIGN PATENT DOCUMENTS

| | | |
|---|---|---|
| 55-86835 | 7/1980 | Japan. |
| 1143859 | 2/1966 | United Kingdom ............ 264/331.18 |
| 1 207 440 | 9/1970 | United Kingdom. |

*Primary Examiner*—Jeffery R. Thurlow
*Attorney, Agent, or Firm*—Myers Bigel Sibley & Sajovec, L.L.P.

[57] ABSTRACT

A shrink resistant resin composition which is curable at room temperature. The composition is (a) a curable unsaturated polyester resin, (b) an accelerator, (c) a low temperature free radical peroxide initiator, and (d) a low profile additive comprising polyolefin powder. The resin composition may be cured at room temperature to provide a molded article which exhibits improved shrink-resistance.

19 Claims, No Drawings

SHRINK-CONTROLLED RESIN COMPOSITION

FIELD OF THE INVENTION

The present invention relates to resin compositions, and more particularly to unsaturated polyester resin compositions curable at room temperature.

BACKGROUND OF THE INVENTION

Unsaturated polyester resins, and particularly reinforced unsaturated polyester resins have wide commercial utility in manufacturing such items as automotive parts, boat hulls, bath and kitchen fixtures (e.g., sink basins, vanity tops, shower units, etc.), aerospace parts, storage tanks and the like. Various fabrication techniques can be used, including among others, hand lay-up, matched metal-die molding, compression molding including the use of sheet molding compound ("SMC") and bulk molding compound ("BMC"), transfer molding, injection molding, and resin transfer molding ("RTM"). Unsaturated polyester resins often have to be cured at elevated temperatures (e.g., temperatures greater than about 40° C. and often greater than about 120° C.) to obtain the desired properties, and particularly the desired surface Exposure to elevated temperatures, however, is often detrimental to the quality of the resulting molded article. Moreover, expensive tooling made from heat resistant materials (e.g., steel and chrome) and having means for providing heat to the tool often have to be utilized.

Molding at elevated temperatures is usually required when attempting to mold articles (e.g., automotive exterior parts) that require a smooth surface quality and exhibit reduced shrinkage and warpage. Parts requiring such characteristics are known as Class A articles. When molding Class A articles, compression molding techniques are conventionally used in conjunction with a low profile additive added to the resin, and the resin is cured at elevated temperatures. See, for example, U.S. Pat. Nos. 4,525,498 to Atkins et al., 4,172,059 to Atkins et al., and 3,701,748 to Kroekel.

Despite the general availability of unsaturated polyester resins using low profile additives to provide improved shrinkage control, there continues to be a need for improvements in molding resins, and particularly molding unsaturated polyester resins at room temperature. Resins that cure (mold) at room temperature have heretofore not been entirely successful when used in molding Class A articles. Conventional thinking is that elevated molding temperatures (e.g., on the order of 120° C. to 160° C.) are necessary to obtain Class A surfaces. Additionally, it would be desirable for shrinkage control to be provided when the article is post cured such as when subjected to heat during painting.

SUMMARY OF THE INVENTION

As a first aspect, the present invention provides a shrink resistant resin composition which is curable at room temperature. The composition comprises (a) a curable unsaturated polyester resin, (b) an accelerator, (c) a low temperature free radical peroxide initiator, and (d) a low profile additive comprising polyolefin powder. The resin composition may be cured at room temperature to provide a molded article which exhibits improved shrink-resistance without the need to use elevated molding temperatures, i.e., greater than 50° C.

As a second aspect, the present invention provides a fiber-reinforced resin composition which is curable at room temperature. The resin composition comprises (a) from about 40 to about 98 percent by weight of a curable unsaturated polyester resin, (b) from about 0.1 to about 1.0 percent by weight of an accelerator, (c) from about 0.5 to about 4 percent by weight of resin of a low temperature free radical peroxide initiator comprising (e.g., a blend of cumene hydroperoxide and acetyl acetone peroxide), (d) from about 5 to about 60 percent by weight of a reinforcing fiber, and (e) from about 0.5 to about 10 percent by weight of a low profile additive comprising polyethylene powder. The resin composition may be cured at room temperature to provide a molded article which exhibits improved shrink-resistance.

As a third aspect, the present invention provides a method of making a shrink-controlled molded article. The method comprises (a) providing a shrink-controlled resin composition comprising a curable unsaturated polyester resin, an accelerator, a low temperature free radical peroxide initiator, and a low profile additive comprising polyolefin powder; (b) forming a shaped article from the resin composition; and (c) subjecting the shaped article to a temperature of between about 20° C. to about 40° C. to cure the unsaturated polyester resin composition to provide a shrink-controlled molded article. The resin composition exhibits improved shrink-resistance during cure to provide a shrink-controlled molded article. Moreover, the article can be post cured (e.g., painted and heated) and shrinkage is still controlled.

The foregoing and other objects and aspects of the present invention are explained in detail in the specification set forth below.

DETAILED DESCRIPTION OF THE INVENTION

The resin composition of the present invention is moldable (curable) at room temperature. As summarized above, the resin composition comprises a curable unsaturated polyester resin, an accelerator, a low temperature free radical peroxide initiator, and a low profile additive comprising polyolefin powder. Preferably, the resin composition comprises about 40 to about 99 percent by weight of curable unsaturated polyester resin (98 percent if filled); about 0.1 to about 10 percent by weight of the accelerator, about 0.5 to about 4 percent by weight of the low temperature free radical peroxide initiator, and about 0.5 to about 10 percent by weight of the low profile additive comprising polyolefin powder. Optionally, the resin composition may also include low profile additives, fillers, inhibitors, reinforcement fibers, and the like.

Suitable unsaturated polyester resins include practically any esterification product of a polybasic organic acid and a polyhydric alcohol, wherein the acid provides the ethylenic unsaturation. Typical unsaturated polyesters are those thermosetting resins made from the esterification of a dihydric alcohol with an ethylenically unsaturated dicarboxylic acid. Examples of useful ethylenically unsaturated polycarboxylic acids include maleic acid, fumaric acid, itaconic acid, dihydromuconic acid, and halo and alkyl derivatives of such acids and anhydrides, and mixtures thereof. Exemplary polyhydric alcohols include saturated polyhydric alcohols such as ethylene glycol, 1,3-propanediol, propylene glycol, 2,3-butanediol, 1,4-butanediol, 2-ethylbutane-1,4-diol, 1,5-pentanediol, 1,6-hexanediol, 1,7-heptanediol, 1,8-octanediol, 1,9-nonanediol, 1,10-decanediol, 2,10-decanediol, 1,4-cyclohexanediol, 1,4-dimethylolcyclohexane, 2,2-diethylpropane-1,3-diol, 2,2-dimethylpropane, 1,3-diol, 3-methylpentane-1,4-diol, 2,2- diethylbutane-1,3-diol, 4,5-nonanediol, diethylene glycol, triethylene glycol, dipropylene glycol, glycerol, pentaerythritol, erythritol, sorbitol, mannitol, 1,1,1-trimethylolpropane, trimethylolethane, hydrogenated bisphenol-A and the reaction products of bisphenol-A with ethylene or propylene oxide.

The unsaturated polyester resins are generally crosslinked with a compatible crosslinking monomer such as styrene, vinyl toluene, methyl methacrylate, methyl styrene, divinyl benzene, diallyl phthalate and the like. The amount of crosslinking monomer is about 10 percent to about 65 percent, and preferably about 25 percent to about 55 percent by weight of the unsaturated polyester resin.

The polyester resin can also be mixed or blended with other thermosetting resins. For example, the polyester resin can be mixed with a crosslinkable polyurethane such as described in U.S. Pat. No. 4,062,826 to Hutchinson et al., the disclosure of which is incorporated herein by reference. The use of other thermosetting resins and blends thereof will be within the skill of one in the art. Optionally, a low profile additive can be included, particularly those based on mixtures of thermoplastic polymers of vinyl acetate of epoxy compounds having at least one 1,2-epoxy group per molecule as described in U.S. Pat. No. 4,525,498 to Atkins et al, the disclosure of which is incorporated herein by reference. Suitable thermoplastic vinyl acetate polymers are polyvinyl acetate homopolymers and thermoplastic copolymers containing at least 50 percent by weight vinyl acetate. Such polymers include for example, vinyl acetate homopolymer; carboxylated vinyl acetate polymers including copolymers of vinyl acetate and ethylenically unsaturated carboxylic acids, such as acrylic acid, methacrylic acid, maleic acid, fumaric acid, itaconic acid and the like or anhydrides such as maleic anhydride; vinyl acetate/vinyl chloride/maleic acid terpolymer, and the like. The useful vinyl acetate polymers typically have molecular weights within the range of from about 10,000 to about 250,000, and preferably from about 25,000 to about 175,000. Suitable epoxy compounds having at least one 1,2-epoxy group per molecule can be based on aliphatic, cycloaliphatic or aromatic backbones.

Exemplary accelerators are dialkyl-p-toluidine, such as dimethyl-p-toluidine, diethyl-p-toluidine and the like. The dimethyl-p-toluidine accelerator is preferred and is available, for example, from RSA Corporation of Arsdley, N.Y. Other accelerators include other amines such as n,n-dimethylaniline, n,n-diethylaniline and the like.

Suitable free radical peroxide initiators include t-butyl hydroperoxide, t-butyl perbenzoate, benzoyl peroxide, methyl ethyl ketone peroxide, or others known in the art. Preferred initiators are methyl ethyl ketone peroxide or a blend of cumene hydroperoxide and acetyl acetone peroxide. The blend of cumene hydroperoxide and acetyl acetone peroxide is typically about a 1:1 to about 1:9 blend, with a blend of from about 1:4 to 1:5 cumene hydroperoxide to acetyl acetone peroxide being preferred.

Exemplary alkali metal and transition metal salts capable of reacting with the free radical initiator to initiate polymerization include acetate, butyrate, benzoate, capronate, laureate, palmitate, octoate, propionate and naphthenate salts of Na, K, Li, Pb, Fe, Co, Ni, Zn and V. A preferred transition metal salt is cobalt naphthenate or cobalt octoate. These compounds are also sometimes referred to as accelerators.

The resin composition can also include an inhibitor to give shelf stability and adjust gel time. Exemplary inhibitors include tertiary butyl catechol, hydroquinone, p-benzoquinone, monotertiary butyl hydroquinone, 1,4-naphthoquinone, toluhydroquinone, and di-tert-butyl-p-cresol. Preferably, the mount of inhibitor in the resin composition ranges from about 0.005 to about 0.5 percent by weight.

The resin composition can optionally include a filler such as calcium carbonate (e.g., SnowFlake available from ECC America, Inc. of Sylacauga, Ga.), alumina powder, hydrated alumina, quartz powder, crushed silica, calcium sulfate, kaolin, talc and the like. Preferably, the amount of filler in the resin composition ranges from about 25 to about 200 percent by weight.

The resin composition optionally can include reinforcement fibers. Suitable reinforcement fibers include fibers of glass, carbon, aromatic polyamides, ceramic and various metals. The fibers are used in amounts of about 5 to about 75 percent, and preferably about 20 to 60 percent by weight based on the weight of the resin composition. Also, a veil mat can be used.

Suitable resin compositions are the Polylite® series of unsaturated polyester resins available from Reichhold Chemicals, Inc., Research Triangle Park, N.C. A specific resin composition is Polylite® 31520. Polylite® 31520 is a mixture of unsaturated polyester resins having a very high ethylenic unsaturation, XLPR-85D44 (a mixture of thermoplastic vinyl acetate and epoxy compound having at least one 1,2-epoxy group per molecule available from Union Carbide, Charleston, W. Va.), dimethyl-p-toluidine and cobalt octoate accelerators, a blend of cumene hydroperoxide and acetyl acetone peroxide, cobalt octoate promoter, and tertiary butyl catechol inhibitor.

The low profile additive comprises polyolefin powder. Polyolefin powder low profile additives are commercially available under the tradename MICROTHENE® F from Quantum Chemical Div., Cincinnati, Ohio. One preferred form of the low profile additive comprises polyethylene powder and is available under the tradename MICROTHENE® FN510 from Quantum Chemicals Div.

In operation, the resin composition is formed by mixing together the individual constituents and forming the composition into a shaped article using any of the various known molding techniques (e.g., hand lay-up, compression molding, RTM, and the like). The resin composition is molded into an article at room temperature or slightly above (e.g., of about 20° C. to about 40° C.) at a pressure of about 1 atm to about 100 atm to form the molded article with or without vacuum assist to get the resin in the mold. As a significant advantage, the present invention provides a resin composition which is moldable (curable) at room temperature, which resists shrinkage. Prior to the present invention, previously known shrink control resin compositions required elevated temperatures (e.g., in excess of 200° F., typically between 250° F. and 350° F.) to effect cure. The present invention provides the distinct advantage of avoiding the need for such elevated temperatures to effect resin cure although elevated temperatures can be used. Additionally, shrinkage can be controlled during post curing such as the high temperatures encountered in an oven used to cure the primer and top coat of a colored paint.

Additional benefits and advantages of the invention will be apparent to those skilled in the art from the following illustrative examples. Unless otherwise noted, all parts and percentages are by weight of the resin composition.

EXAMPLE 1

A resin composition is prepared comprising Polylite® 31520 (RCI's low shrink resin) which comprises:

a. 100 parts by weight of unsaturated polyester resin.
b. 0.4 parts by weight of dimethyl-p-toluidine accelerator.

c. 0.4 parts by weight of cobalt octoate accelerator, d. 1.25 parts by weight of a 1:4 blend of cumene hydroperoxide and acetyl acetone peroxide, e. varying amounts of MICROTHENE® FN510 as indicated in Table 1 below, and f. 25 to 26.6 parts by weight of Snowflake calcium carbonate filler.

The temperature of the resin composition is adjusted to 77° F. and poured into a shrink test bar mold coated with a release wax. The mixture is allowed to gel and cure. After approximately one hour, the cured sample is removed from the mold and allowed to cool to room temperature (i.e., 25° C.). After three hours measured from the time cured sample is removed from the mold, the cured sample is measured with vernier calipers to obtain the initial measurement. The cured sample is allowed to stand overnight at room temperature, and the length is again measured using vernier calipers to obtain the second measurement. Thereafter, the sample is post cured in an oven for 1 hour at 250° F., and allowed to cool to room temperature (for approximately 3 hours). The length of the post cured sample is measured again using vernier calipers to obtain the third measurement. The changes, if any in the measurements taken are compared to the length of the mold to determine shrinkage and/or resistance thereto. The measurements were also compared to a control sample comprising the same resin composition as set forth above, but excluding the MICROTHENE® FN510 polyethylene powder. A second control sample prepared according to the first, but also including filler material was also evaluated. The data collected are reported at Table 1. The results indicate that the resin composition including MICROTHENE FN510 polyethylene powder resist shrinkage better than the control sample.

TABLE 1

| Resin | Initial[1] | Second | Third |
|---|---|---|---|
| Control | −1.45[2] | −1.10 | −5.85 |
| 3 parts MICROTHENE ® | −0.75 | −0.65 | −0.95 |
| 4 parts MICROTHENE ® | −0.35 | −0.1 | +1.35[3] |
| 5 parts MICROTHENE ® | −0.60 | −0.50 | +0.60 |
| Control + 21% CaCO$_3$[4] | −0.45 | −0.25 | −1.1 |
| 1% MICROTHENE + 20% CaCO$_3$ | +0.4 | +0.45 | +0.6 |

[1]Measurements are expressed in thousandths of an inch per inch.
[2](−) indicates that the measurement taken was shorter than (i.e., showing shrinkage) the length of the mold.
[3](+) indicates that the measurement was longer than the previous reading (i.e., reflects expansion of the molded sample).
[4]"CaCO$_3$" refers to calcium carbonate filler.

EXAMPLES 2-5

In order to evaluate the addition of the polyolefin powder to other resins, a series of resins were prepared and the shrinkage measured. The resin compositions are as follows:

| Example | Specific Resins |
|---|---|
| 2 | Polylite ® 31500-05, a high reactive ortho-phthalic unsaturated polyester resin |
| 3 | Polylite ® 31501-05, a medium reactive ortho-phthalic unsaturated polyester resin |
| 4 | Polylite ® 31502-05, a high reactive DCPD unsaturated polyester resin |
| 5 | Polylite ® 31506-06, a medium reactive iso-phthalic unsaturated polyester resin |

| | Shrinkage (expressed in mils per inch) | | | |
|---|---|---|---|---|
| Amount of | Example 2 | | Example 3 | |
| Microthene | Neat | 1% | Neat | 1% |
| Initial | 22.3 | 22.1 | 25.7 | 24.8 |
| Overnight | 22.6 | 22.5 | 26.0 | 25.2 |
| Post cured | 24.5 | 22.7 | 26.1 | 24.3 |

| | Shrinkage | | | |
|---|---|---|---|---|
| Amount of | Example 4 | | Example 5 | |
| Microthene | Neat | 1% | Neat | 1% |
| Initial | 25.4 | 24.0 | 23.5 | 23.6 |
| Overnight | 25.6 | 23.9 | 23.5 | 23.7 |
| Postcured | 26.5 | 21.4 | 28.9 | 24.7 |

The addition of the polyolefin powder has an effect on decreasing the linear shrinkage in both initial and post curing.

The foregoing is illustrative of the present invention and is not to be construed as limiting thereof. The invention is defined by the following claims, with equivalents of the claims to be included therein.

That which is claimed is:

1. A shrink resistant resin composition curable at room temperature comprising:
    (a) a curable unsaturated polyester resin;
    (b) an accelerator;
    (c) a free radical peroxide initiator curable at a temperature of less than 50° C.; and
    (d) a shrinkage controlling polyolefin powder.

2. A resin composition according to claim 1, including an inhibitor selected from the group consisting of tertiary butyl catechol, hydroquinone, p-benzoquinone, monotertiary butyl hydroquinone, 1,4-naphthoquinone, toluhydroquinone, and di-tert-butyl-p-cresol.

3. A resin composition according to claim 1, wherein the free radical initiator is a blend of cumene hydroperoxide and acetyl acetone peroxide.

4. A resin composition according to claim 1, wherein the free radical initiator is methyl ethyl ketone peroxide.

5. A resin composition according to claim 1, further comprising a filler selected from the group consisting of calcium carbonate, alumina powder, hydrated alumina, quartz powder, crushed silica, calcium sulfate, kaolin, and talc.

6. A resin composition according to claim 1, wherein the accelerators are dimethyl-p-toluidine and cobalt octoate.

7. A resin composition according to claim 1, wherein the polyolefin is polyethylene powder.

8. A fiber-reinforced resin composition curable at room temperature comprising:
    (a) from about 40 to about 98 percent by weight of a curable unsaturated polyester resin;
    (b) from about 0.1 to about 1.0 percent by weight of an accelerator;
    (c) from about 0.5 to about 4 percent by weight of resin of a free radical peroxide initiator curable at a temperature of less than 50° C.;
    (d) from about 5 to about 60 percent by weight of a reinforcing fiber; and (e) from about 0.5 to about 10 percent by weight of a shrinkage controlling polyethylene powder.

9. A resin composition according to claim 8, including an inhibitor selected from the group consisting of tertiary butyl catechol, hydroquinone, p-benzoquinone, monotertiary butyl hydroquinone, 1,4-naphthoquinone, toluhydroquinone, and di-tert-butyl-p-cresol.

10. A resin composition according to claim 8, further comprising a filler selected from the group consisting of calcium carbonate, alumina powder, hydrated alumina, quartz powder, crushed silica, calcium sulfate, kaolin, and talc.

11. A resin composition according to claim 8, wherein the reinforcing fiber is selected from the group consisting of fibers of glass, carbon, aromatic polyamides, ceramic, and metal.

12. A molded article comprising the resin composition of claim 8.

13. A method of making a shrink-controlled molded article comprising:
   (a) providing a shrink-controlled resin composition comprising a curable unsaturated polyester resin, an accelerator, a free radical peroxide initiator curable at a temperature of less than 50° C., and a shrinkage controlling polyolefin powder;
   (b) forming a shaped article from the resin composition; and
   (c) subjecting the shaped article to a temperature of from about 0° to 50° C. to cure the unsaturated polyester resin composition to provide a shrink-controlled molded article.

14. The method according to claim 13, wherein the resin composition further comprises an inhibitor selected from the group consisting of tertiary butyl catechol, hydroquinone, p-benzoquinone, monotertiary butyl hydroquinone, 1,4-naphthoquinone, toluhydroquinone, and di-tert-butyl-p-cresol.

15. The method according to claim 13, wherein the free radical initiator is a blend of cumene hydroperoxide and acetyl acetone peroxide.

16. The method according to claim 13, wherein the free radical initiator is methyl ethyl ketone peroxide.

17. The method according to claim 13, wherein the resin composition further comprises a filler selected from the group consisting of calcium carbonate, alumina powder, hydrated alumina, quartz powder, crushed silica, calcium sulfate, kaolin, and talc.

18. The method according to claim 13, wherein the dialkyl-p-toluidine accelerator is dimethyl-p-toluidine.

19. The method according to claim 13, wherein the polyolefin is polyethylene powder.

* * * * *